(12) United States Patent
Ichikawa (10) Patent No.: US 6,786,942 B2
(45) Date of Patent: Sep. 7, 2004

(54) FUEL REFORMING SYSTEM AND STOPPING METHOD THEREOF

(75) Inventor: Hiroyuki Ichikawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 491 days.

(21) Appl. No.: 09/984,701

(22) Filed: Oct. 31, 2001

(65) Prior Publication Data

US 2002/0059753 A1 May 23, 2002

(30) Foreign Application Priority Data

Nov. 20, 2000 (JP) ........................................ 2000-352594

(51) Int. Cl.[7] ............................... C10J 3/68; C10J 1/20; C10K 3/06; B01J 7/00
(52) U.S. Cl. ............................. 48/76; 48/61; 48/199 R; 48/192
(58) Field of Search ........................... 48/61, 62 R, 75, 48/76, 63, 127.9, 192, 197 R, 198.1, 198.7, 199 R, 211, 212, 214 R, 215, 214 A; 422/105, 107, 108, 110, 111, 211, 222

(56) References Cited

U.S. PATENT DOCUMENTS 3,963,641 A   6/1976   Pockrandt
6,290,877 B2 * 9/2001   Naka et al. .................. 252/373

FOREIGN PATENT DOCUMENTS

JP    5-275105      10/1993
WO    WO 00/66487 A1    11/2000

* cited by examiner

*Primary Examiner*—Samuel M. Heinrich
(74) *Attorney, Agent, or Firm*—Foley & Lardner LLP (57) ABSTRACT

When a fuel reforming system for a fuel cell comprising an autothermal reformer 1 wherein a partial oxidation reaction and steam reforming reaction proceeds simultaneously, is stopped, firstly, a supply valve 6 is closed to stop supply of fuel and water for steam reforming, and a supply valve 7 is closed after a predetermined time has elapsed to stop supply of air. In this way, the partial oxidation reaction which is an exothermic reaction is continued temporarily and the catalyst layer temperature of the reformer 1 is raised, so the catalyst layer temperature can be maintained high until the system restarts, and the time required for restarting the system can be shortened.

13 Claims, 11 Drawing Sheets

FUEL REFORMING SYSTEM AND STOPPING METHOD THEREOF

FIELD OF THE INVENTION

This invention relates to a fuel reforming system for a fuel cell and method of stopping the system.

BACKGROUND OF THE INVENTION

JP-A-H5-275105 published by the Japanese Patent Office in 1993 discloses a technique wherein the fall in a fuel cell plant temperature is reduced and the startup time of the plant is shortened by recirculating high temperature gas at the outlet of a carbon monoxide removal device upstream of a reformer when the system stops.

SUMMARY OF THE INVENTION

However, if it is attempted to apply this prior art stopping method to a relatively lightweight universal fuel reforming system for a fuel cell such as that installed in an automobile, it is necessary to install a special pipe or flow rate change-over valve to recirculate gas from the carbon monoxide removal device upstream of the reformer and the construction of the reforming system becomes complex, which interferes with the compactness and low cost of the reforming system.

It is therefore an object of this invention to provide a fuel reforming system and method of stopping the system which permits the startup time of the reforming system to be shortened without making the system complex or too large.

In order to achieve above object, this invention provides a method of stopping a fuel reforming system with a reformer which generates hydrogen supplied to a fuel cell wherein fuel, water and air are supplied, and a partial oxidation reaction and steam reforming reaction are simultaneously performed, comprising stopping the supply of fuel and water to the reformer so as to raise the catalyst layer temperature of the reformer by performing a partial oxidation reaction with the remaining fuel and air in the reformer, and stopping the supply of air to the reformer after the catalyst layer temperature has risen.

According to an aspect of this invention, this invention provides a fuel reforming system, comprising a reformer which generates hydrogen supplied to a fuel cell wherein fuel, water and air are supplied, and a partial oxidation reaction and steam reforming reaction are simultaneously performed, a first supply mechanism which supplies fuel and water to the reformer, a second supply mechanism which supplies air to the reformer, and a controller which functions to perform a partial oxidation reaction with the remaining fuel and air in the reformer by stopping the supply of fuel and water to the reformer from the first supply mechanism when the system is stopped, and stop the supply of air to the reformer from the second supply mechanism after the catalyst layer temperature has risen.

The details as well as other features and advantages of this invention are set forth in the remainder of the specification and are shown in the accompanying drawings.

DESCRIPTION OF THE PREFERRED EMBODIMENTS

Figure 1:
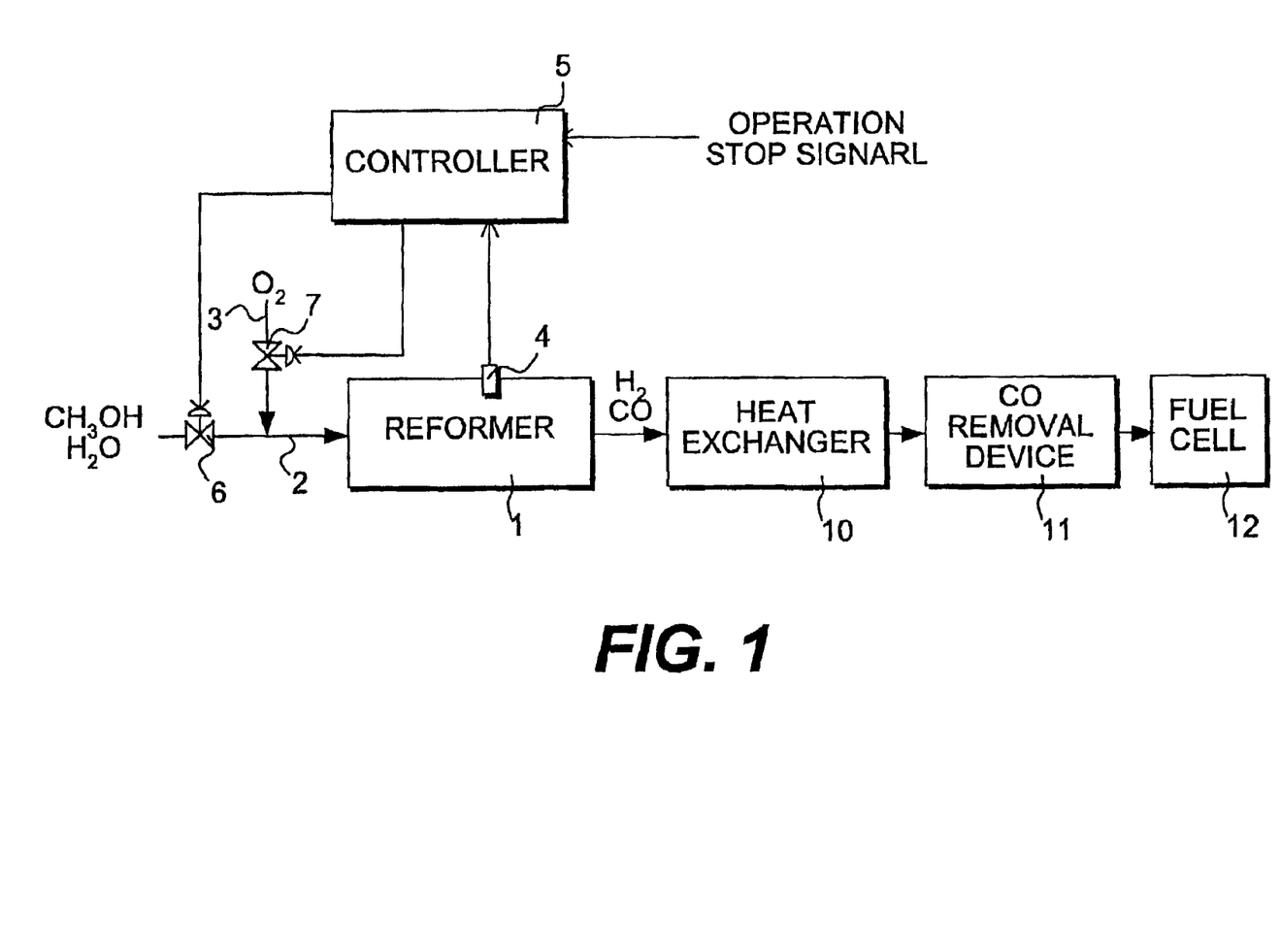
FIG. 1 is a schematic view of a fuel reforming system according to this invention.

Referring to FIG. 1 of the drawings, a reformer 1 is an autothermal reformer (ATR) in which a partial oxidation reaction (exothermic reaction) and steam reforming reaction (endothermic reaction) proceed simultaneously to achieve a balance between heat emission and heat absorption. The outer surface of the reformer 1 is heat-insulated treated to suppress release of heat to the outside.

A first supply pipe 2 which supplies a vapor comprising a mixture of water and methanol is connected to the reformer 1, and a second supply pipe 3 which supplies air is connected midway to the first supply pipe 2. A temperature sensor 4 for detecting a catalyst layer temperature in the reformer 1 is installed in the reformer 1.

When the system is operated, a controller 5 opens a first supply valve 6 interposed in the first supply pipe 2, opens a second supply valve 7 interposed in the second supply pipe 3, supplies a vapor comprising fuel and water, and air, to the catalyst layer in the reformer 1, and carries out the following partial oxidation reaction and steam reforming reaction simultaneously. The first supply valve 6 is a valve which can set the proportion of fuel and water as desired upon a command from the controller 5.

(Partial Oxidation Reaction $$CH_3OH + 1/2O_2 \rightarrow 2H_2 + CO_2$$

(Steam Reforming Reaction $$CH_3OH + H_2O \rightarrow 3H_2 + CO_2$$

The partial oxidation reaction is an exothermic reaction, the steam reforming reaction is an endothermic reaction, and the controller 5 controls the supply amount of water and air supplied to the reformer 1 so that the heat absorbed by the steam reforming reaction is balanced by the heat emitted by the partial oxidation reaction. The reformate gas generated in the reformer 1 is supplied to a fuel cell 12 via a heat exchanger 10 and carbon monoxide removal device 11.

Figure 10:
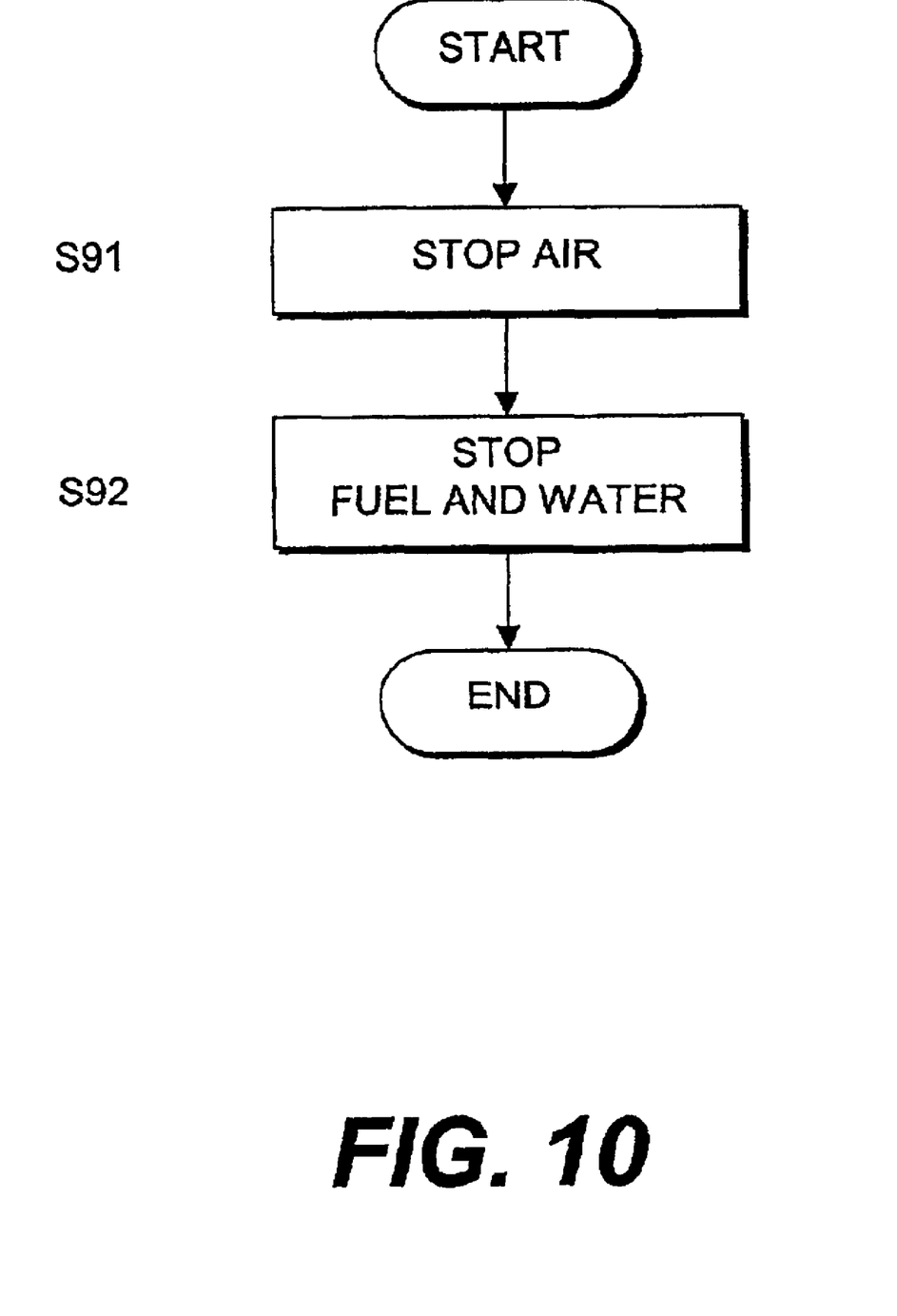
FIG. 10 is a flowchart showing a stop process of a fuel reforming system when this invention is not applied.
Figure 11:
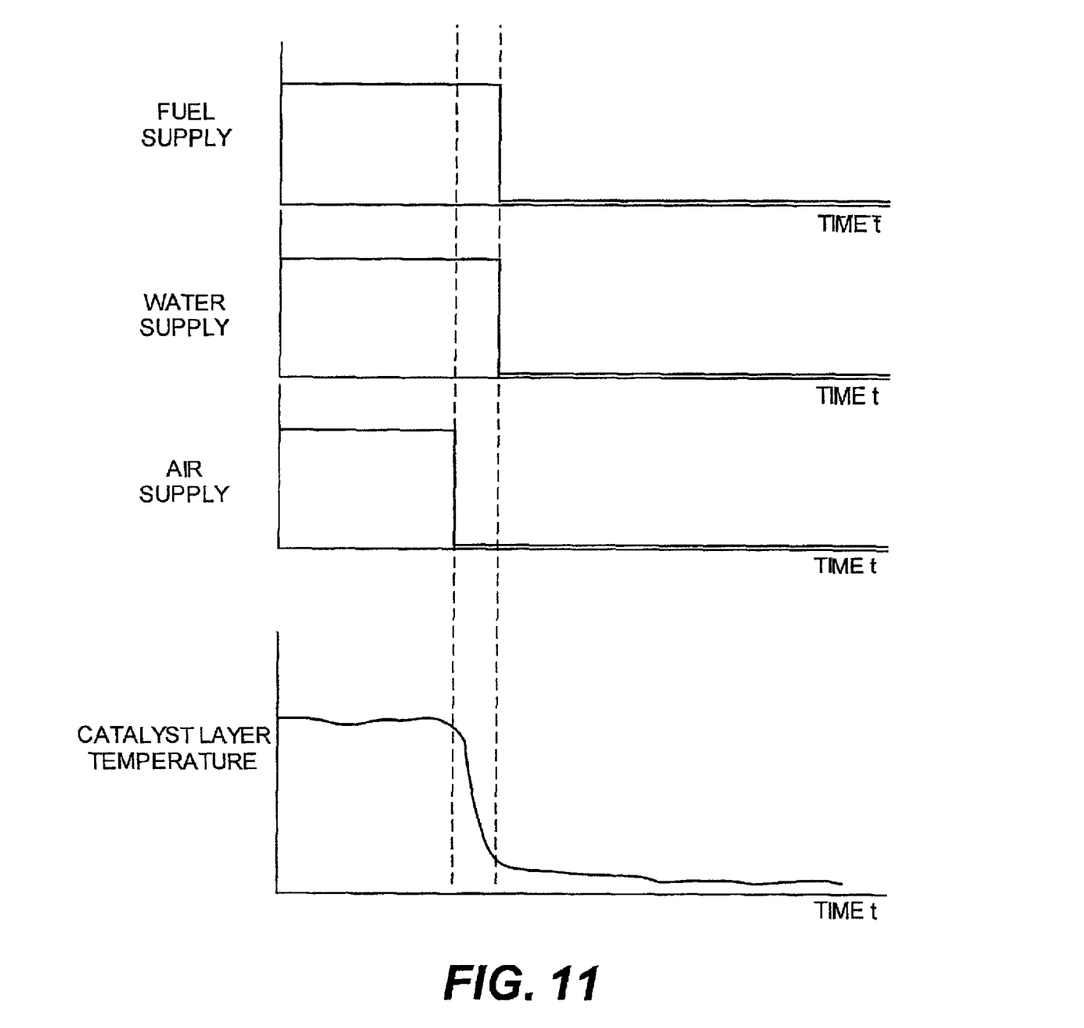
FIG. 11 is a time chart showing how fuel, water, air supply flowrate and catalyst layer temperature vary when the fuel reforming system stops and this invention is not applied.

Also, the controller 5 stops the system upon a stop signal from outside (for example, from another controller). However, if supply of air to the reformer 1 is stopped first (step S91) and supply of fuel and water is then stopped (step S92) as shown in FIG. 10, only the steam reforming reaction which is an endothermic reaction proceeds due to supplied fuel and water, and the catalyst layer temperature falls sharply as shown in FIG. 11. If the supply of air, fuel and water are stopped simultaneously, the catalyst layer temperature does not fall sharply immediately afterwards, but as the temperature falls during the stoppage, the catalyst layer temperature when the system is restarted is low.

If the catalyst layer temperature falls during stoppage, the time required to raise the catalyst layer temperature to the activation temperature when the reforming system is again operated, i.e., the time required to start the reforming system up, is long. When this system is applied to a fuel cell vehicle, this may lengthen the time until the vehicle is able to run.

In the fuel reforming system according to this invention, the catalyst layer temperature is maintained high during stop by applying the following method of stopping the system, and the time required to start the system up again is shortened.

Figure 2:
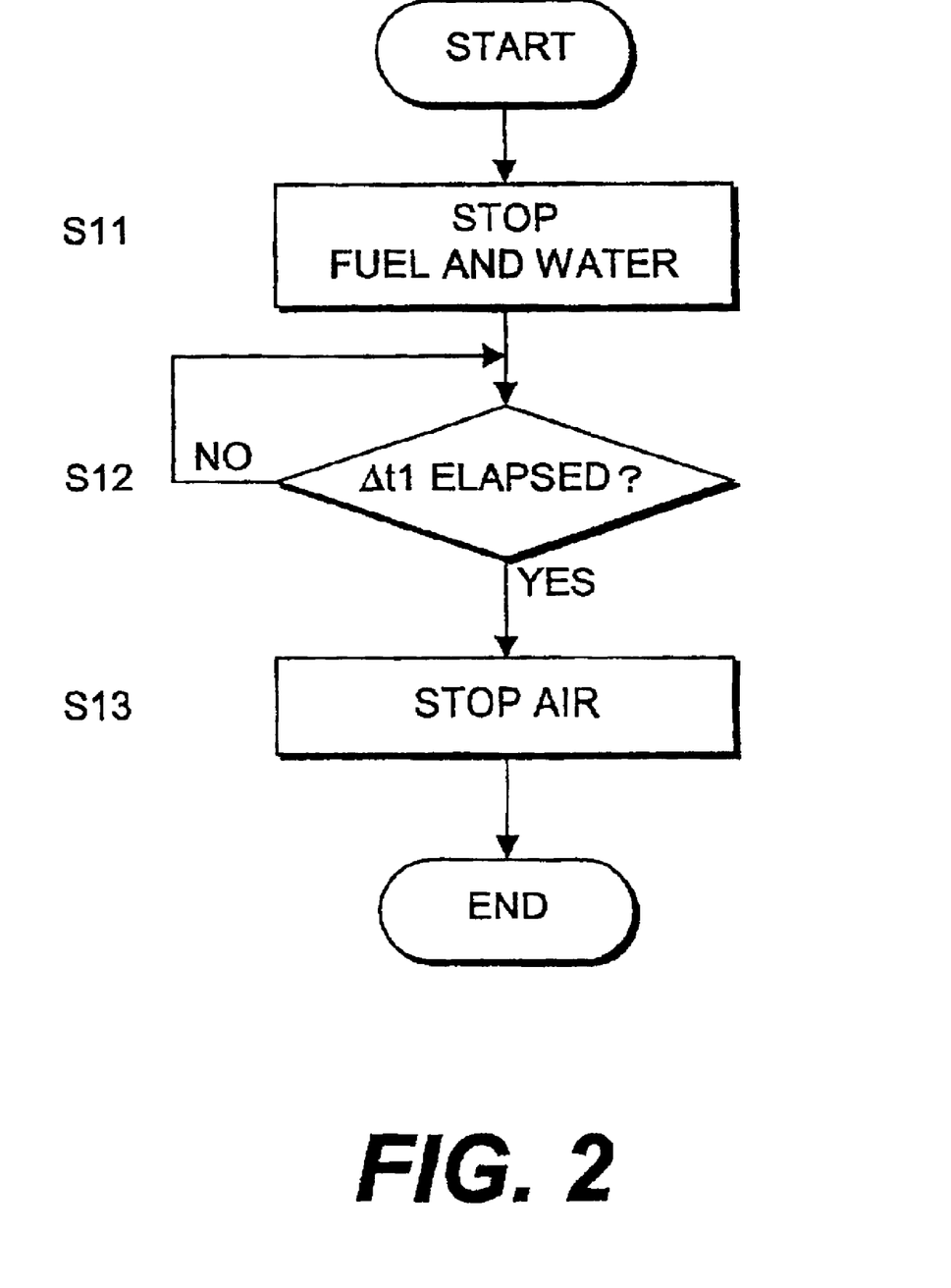
FIG. 2 is a flowchart showing a fuel reforming system stop process.

FIG. 2 is a flowchart showing the processing performed by the controller 5 when the fuel reforming system is stopped, and which is performed when a stop signal is input to the controller 5 from outside.

Describing the stop processing referring to this flowchart, firstly, in a step S11, the first supply valve 6 is closed to stop the supply of fuel and water to the reformer 1.

In a step S12, it is determined whether or not a predetermined time Δt1 has elapsed from when supply of fuel and water was stopped, and if the predetermined time Δt1 has elapsed, the routine proceeds to a step S13. The predetermined Δt1 time in this case is set from approximately 0.1 sec to 90 seconds.

In the step S13, the second supply valve 7 is closed, and supply of air to the reformer 1 is stopped.

Figure 3:
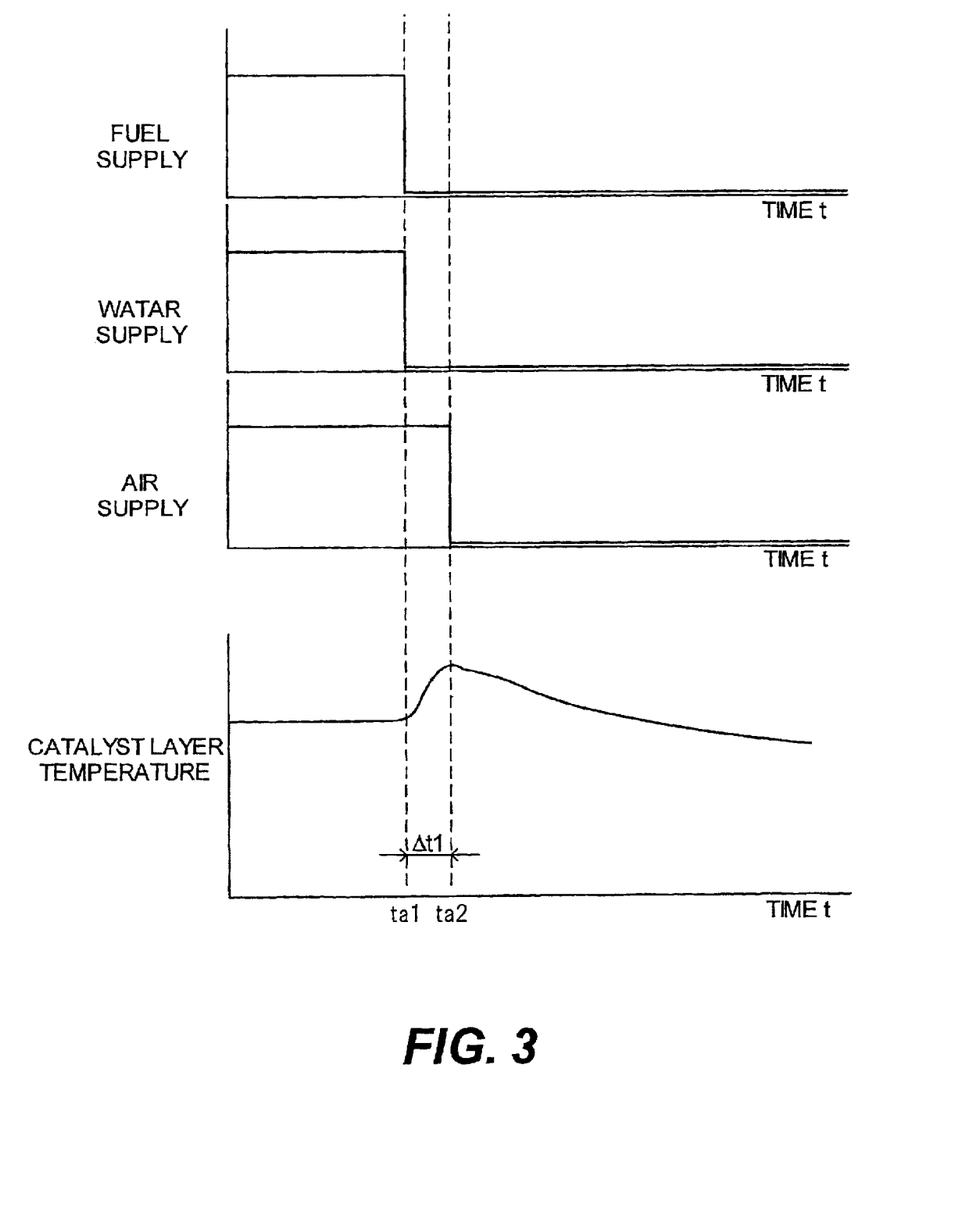
FIG. 3 is a time chart showing how fuel, water, air supply flowrate and catalyst layer temperature vary when the fuel reforming system stops.

FIG. 3 shows how the fuel, water and air supply flowrates, and the catalyst layer temperature, vary when the above processing is performed.

As shown in this figure, when the supply of fuel and water to the reformer 1 is stopped at a time ta1, as there is temporarily a high proportion of air in the reformer 1, the partial oxidation reaction which is an exothermic reaction is activated, and the catalyst layer temperature rises. At the same time, as supply of water is stopped, the steam reforming reaction which is an endothermic reaction no longer takes place.

When the supply of air is stopped after the predetermined time Δt1 has elapsed, the partial oxidation reaction no longer takes place and the rise of catalyst layer temperature also stops (time ta2), but as the reformer 1 is heat-insulated, the subsequent catalyst layer temperature falls gradually.

Thus, by performing the stop processing shown in FIG. 2, the catalyst layer temperature can be maintained high for a long time after the stop. If the catalyst layer temperature when the system is restarted is high, the time required for the catalyst layer temperature to reach the activation temperature will be much shorter, and the time required to restart the system will be shorter.

Next, a second embodiment will be described. The construction of the system is identical to that of the first embodiment, only the processing performed by the controller 5 being different.

Figure 4:
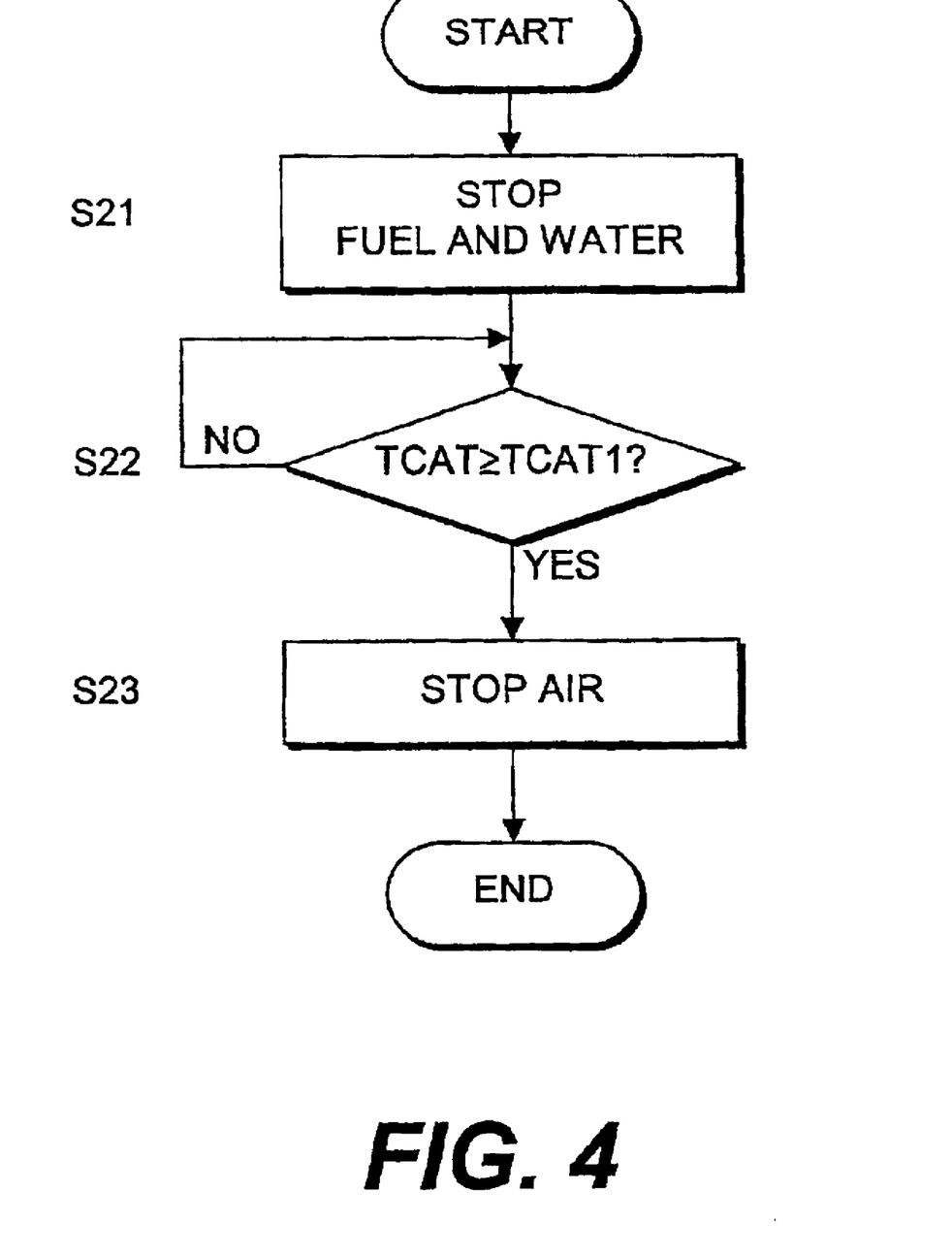
FIG. 4 shows a second embodiment of this invention.

FIG. 4 is a flowchart showing the processing performed by the controller 5 when the fuel reforming system is stopped. This processing is performed when a stop signal is input to the controller 5 from outside.

According to this, firstly, in a step S21, the first supply valve 6 is closed, and supply of fuel and water to the reformer 1 is stopped.

Next, in a step S22, it is determined whether or not the catalyst layer temperature TCAT has reached a predetermined temperature TCAT1 based on the output of the temperature sensor 4, and if the catalyst layer temperature TCAT has reached the predetermined temperature TCAT1, the routine proceeds to a step S23. The predetermined temperature TCAT1 is set according to the catalyst heat resistance temperature, for example, in the case of a Cu, Cu—Zn catalyst, it is set from 200° C. to 600° C., and in the case of a Pd—Zn catalyst, it is set from 250° C. to 900° C.

In the step S23, the second supply valve 7 is closed, and supply of air to the reformer 1 is stopped.

Figure 5:
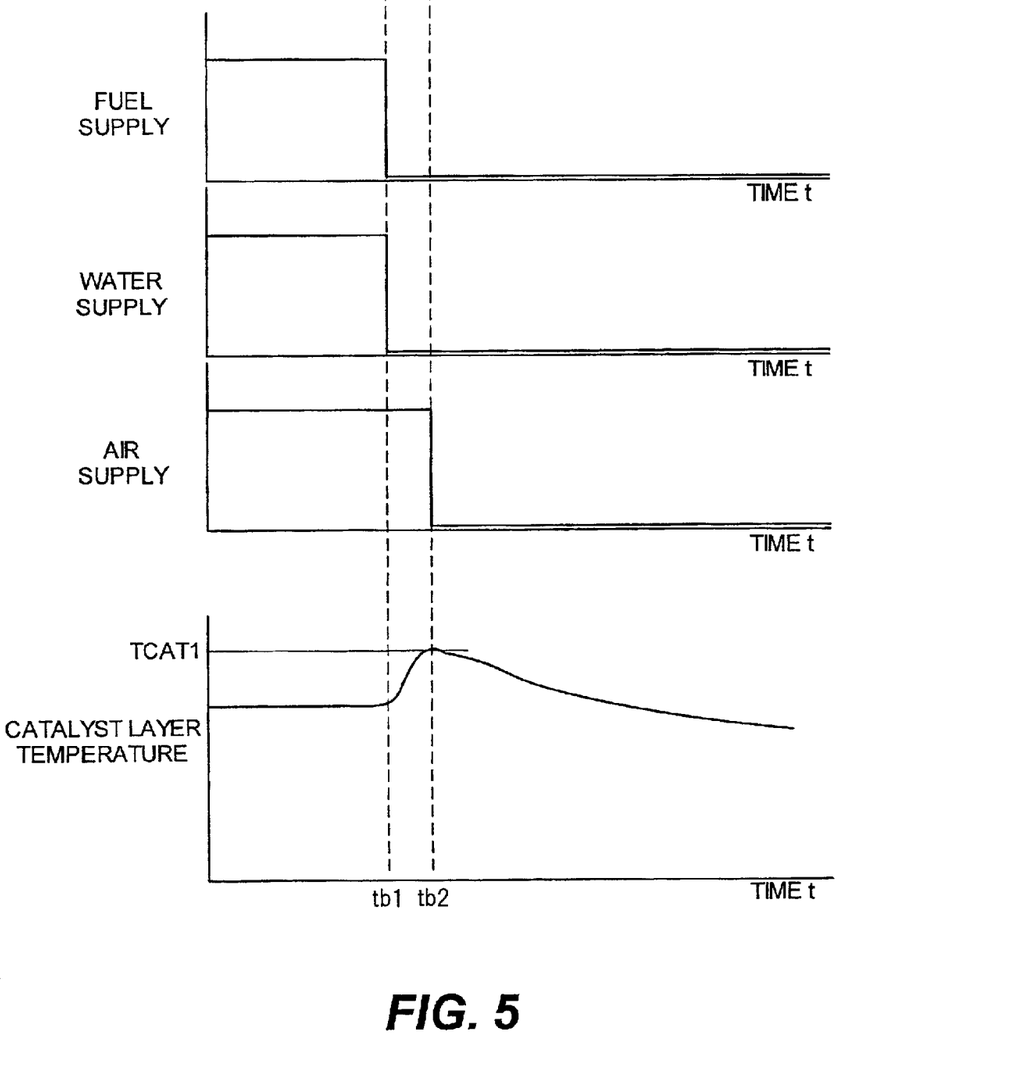
FIG. 5 is a time chart showing how fuel, water, air supply flowrate and catalyst layer temperature vary when the fuel reforming system stops in the second embodiment.

FIG. 5 is a time chart showing how fuel, water and air supply flowrates, and catalyst layer temperature, vary when the above processing is performed.

At a time tb1, when supply of fuel and water to the reformer 1 is stopped, there is temporarily a high proportion of air in the reformer 1, so the partial oxidation reaction is activated and the catalyst layer temperature rises.

When the catalyst activation temperature reaches a predetermined temperature TCAT1, the supply of air is stopped (time tb2, the partial oxidation reaction which is an exothermic reaction no longer takes place and the rise of catalyst layer temperature stops, but as the reformer 1 is heat-insulated, the catalyst layer temperature subsequently falls slowly.

Consequently, the catalyst layer temperature is maintained high when the system stops as in the case of the previous embodiment. In this embodiment, the catalyst layer temperature can be raised until the predetermined temperature TCAT1, which prevents supply of air from stopping before the catalyst layer temperature rises sufficiently, and prevents the catalyst from deteriorating due to supply of air even after the catalyst layer temperature exceeds the heat resistance temperature.

Next, a third embodiment will be described. The construction of the system is identical to that of the first embodiment, only the processing performed by the controller 5 being different.

Figure 6:
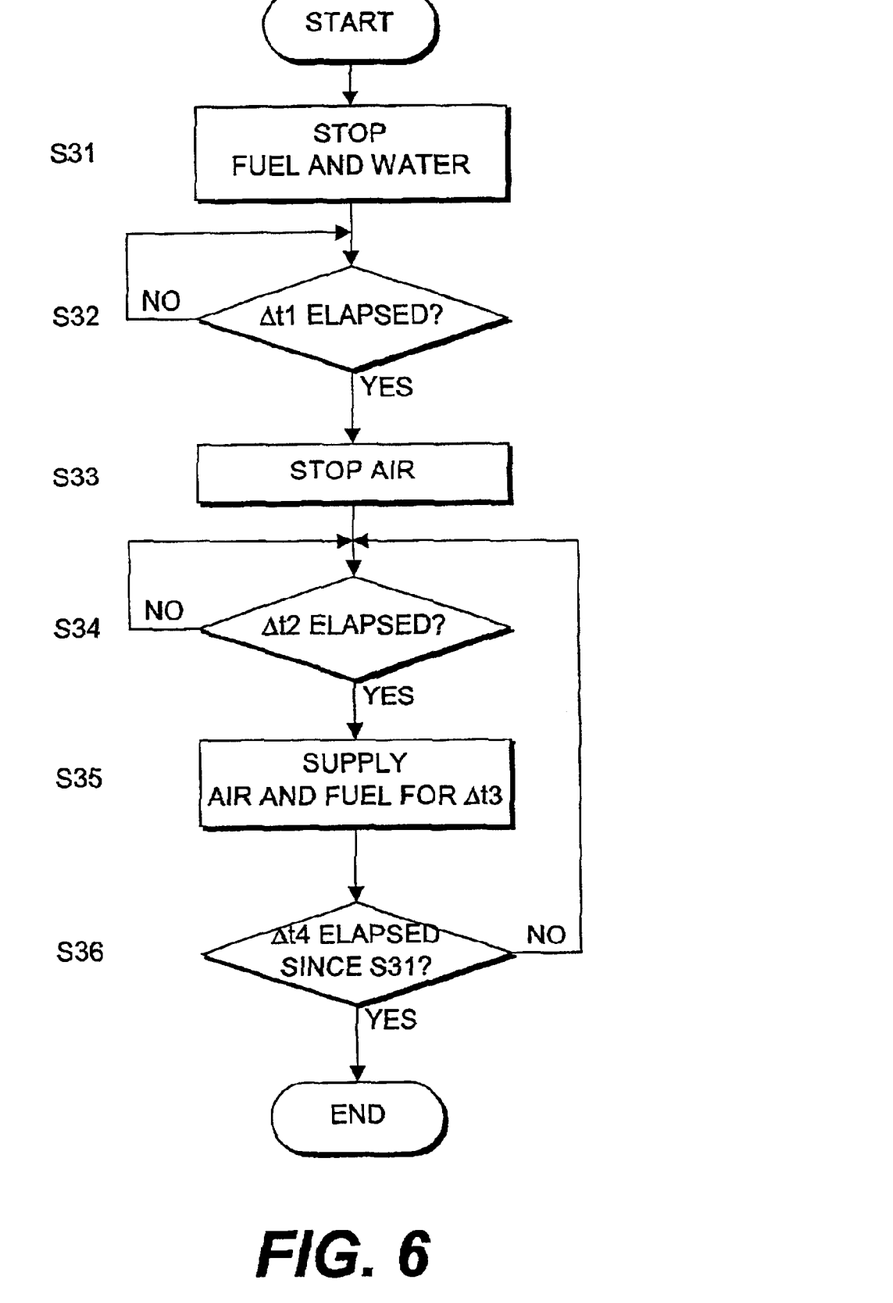
FIG. 6 shows a third embodiment of this invention.

FIG. 6 is a flowchart showing the processing performed by the controller 5 when the fuel reforming system is stopped, and a stop signal is input to the controller from outside.

Firstly, in a step S31, the first supply valve 6 is closed, and supply of fuel and water to the reformer 1 is stopped. In a step S32, it is determined whether or not a predetermined time Δt1 has elapsed, and if the predetermined time Δt1 has elapsed, the routine proceeds to a step S33. The predetermined time Δt1 here is set from approximately 0.1 sec to 90 seconds.

In the step S33, the second supply valve 7 is closed, and supply of air to the reformer 1 is stopped.

In a step S34, it is determined whether or not a predetermined time Δt2 has elapsed since supply of air was stopped in the step S33, and if the predetermined time Δt2 has elapsed, the routine proceeds to a step S35. The predetermined time Δt2 here is set from approximately 1 min to 300 minutes.

In the step S35, the first supply valve 6 and second supply valve 7 are opened, and air and fuel are supplied for a predetermined time Δt3. The predetermined time Δt3 here is set from approximately 0.1 sec to 90 seconds.

In a step S36, it is determined whether or not a predetermined time Δt4 has elapsed from when supply of fuel and water was stopped in the step S31. The predetermined time Δt4 here is set from approximately 1 min to 300 minutes. If the predetermined time Δt4 has elapsed, it is determined that the system restart will not be performed for the time being, and processing is terminated. When the predetermined time $\Delta t4$ has not elapsed, the routine returns to the step S34. The predetermined time $\Delta t2$ in the step S34 is set shorter than the predetermined time $\Delta t4$ in the step S36.

Figure 7:
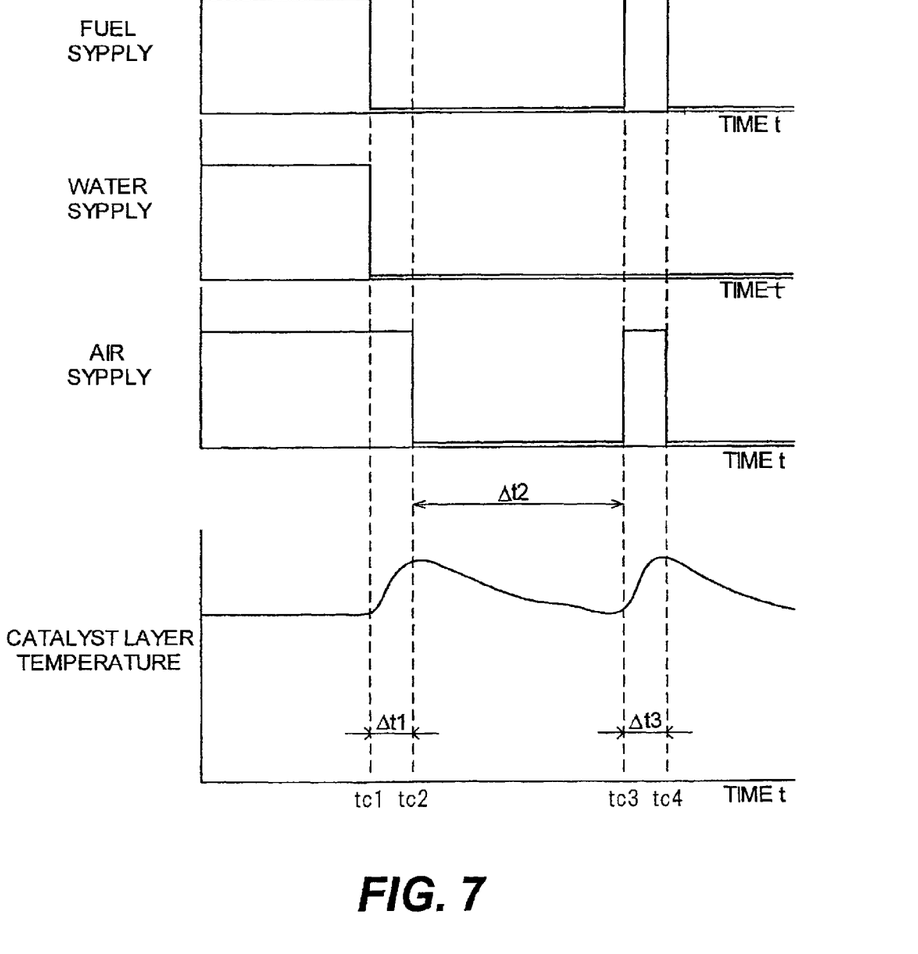
FIG. 7 is a time chart showing how fuel, water, air supply flowrate and catalyst layer temperature vary when the fuel reforming system stops in the third embodiment.

FIG. 7 shows how the fuel, water and air supply flowrates, and catalyst layer temperature, vary when the above stop processing is performed.

When the supply of fuel and water to the reformer 1 is stopped at a time tc1, there is temporarily a high proportion of air in the reformer 1, so the partial oxidation reaction is activated and the catalyst layer temperature rises.

After the predetermined time $\Delta t1$ has elapsed, if supply of air is stopped (time tc2), the partial oxidation reaction which is an exothermic reaction no longer takes place, and rise of the catalyst layer temperature stops.

As time passes, the catalyst layer temperature falls, so air and fuel are temporarily supplied at the predetermined time interval $\Delta t3$ (from a time tc3 to tc4), the partial oxidation reaction is activated again and the catalyst layer temperature is raised.

Therefore, air and fuel are supplied intermittently at the predetermined time interval in the reformer 1, the partial oxidation reaction takes place, and the catalyst layer in the reformer 1 is heated by the heat of reaction, so even if the time from stopping to restarting is long, the catalyst layer temperature in the reformer 1 can be maintained high, and the system restarting time can be shortened.

Next, a fourth embodiment of this invention will be described. The construction of the system is identical to that of the first embodiment, only the processing performed by the controller 5 being different.

Figure 8:
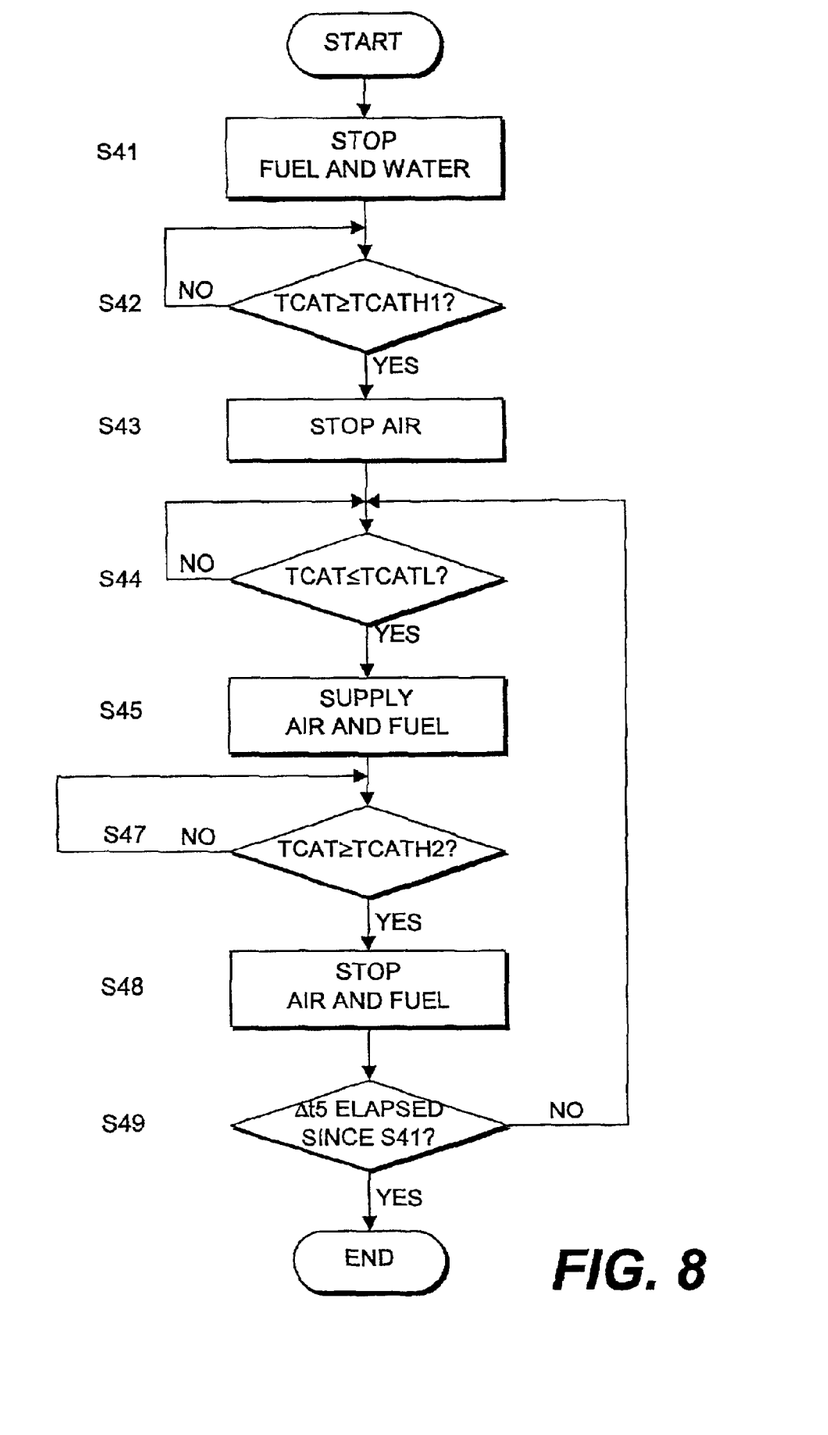
FIG. 8 shows a fourth embodiment of this invention.

FIG. 8 is a flowchart showing the processing performed by the controller 5 when the fuel reforming system is stopped, and a stop signal is input to the controller 5 from outside.

According to this, firstly, in a step S41, the first supply valve 6 is closed, and supply of fuel and water to the reformer 1 is stopped. In a step S42, it is determined whether or not the catalyst layer temperature TCAT has reached a first upper limit temperature TCATH1, and if it has reached the first upper limit temperature TCATH1, the routine proceeds to a step S43. The first upper limit temperature TCATH1 is set according to the catalyst heat resistance temperature, for example, in the case of a Cu, Cu—Zn catalyst it is from 200° C. to 600° C., and in the case of a Pd—Zn catalyst, it is from 250° C. to 900° C.

In the step S43, the second supply valve 7 is closed, and supply of air to the reformer 1 is stopped. In a step S44, it is determined whether or not the catalyst layer temperature TCAT has fallen below a predetermined lower limit temperature TCATL, and if it has fallen below the lower limit temperature TCATL, the routine proceeds to a step S45. The lower limit temperature TCATL is set to the catalyst layer temperature immediately prior to performing the step S41±100° C.

In the step S45, the first supply valve 6 and second supply valve 7 are again opened to supply air and fuel to the reformer 1.

In a step S47, it is determined whether or not the catalyst layer temperature has exceeded a predetermined second upper limit temperature TCATH2. If it has exceeded the second upper limit temperature TCATH2, the routine proceeds to a step S48, and if it has not exceeded the upper limit temperature TCATH2, the routine remains in the step S47. The second upper limit temperature TCATH2 is set to be within a temperature range, which lies from approximately 0° C. to 100° C. lower than the catalyst heat resistance temperature, for example, in the case of a Cu, Cu—Zn catalyst it is set from 100° C. to 600° C., and in the case of a Pd—Zn catalyst, it is set from 150° C. to 900° C.

In a step S48, the first supply valve 6 and second supply valve 7 are closed, and supply of air and fuel to the reformer 1 is stopped.

In a step S49, it is determined whether or not a predetermined time $\Delta t5$ has elapsed since supply of fuel and water was stopped in the step S41. The predetermined time $\Delta t5$ here is set from approximately 1 min to 300 minutes. If the predetermined time $\Delta t5$ has elapsed, it is determined that the system restart will not be performed for the time being, and processing is terminated. When the predetermined time $\Delta t5$ has not elapsed, the routine returns to the step S44.

Figure 9:
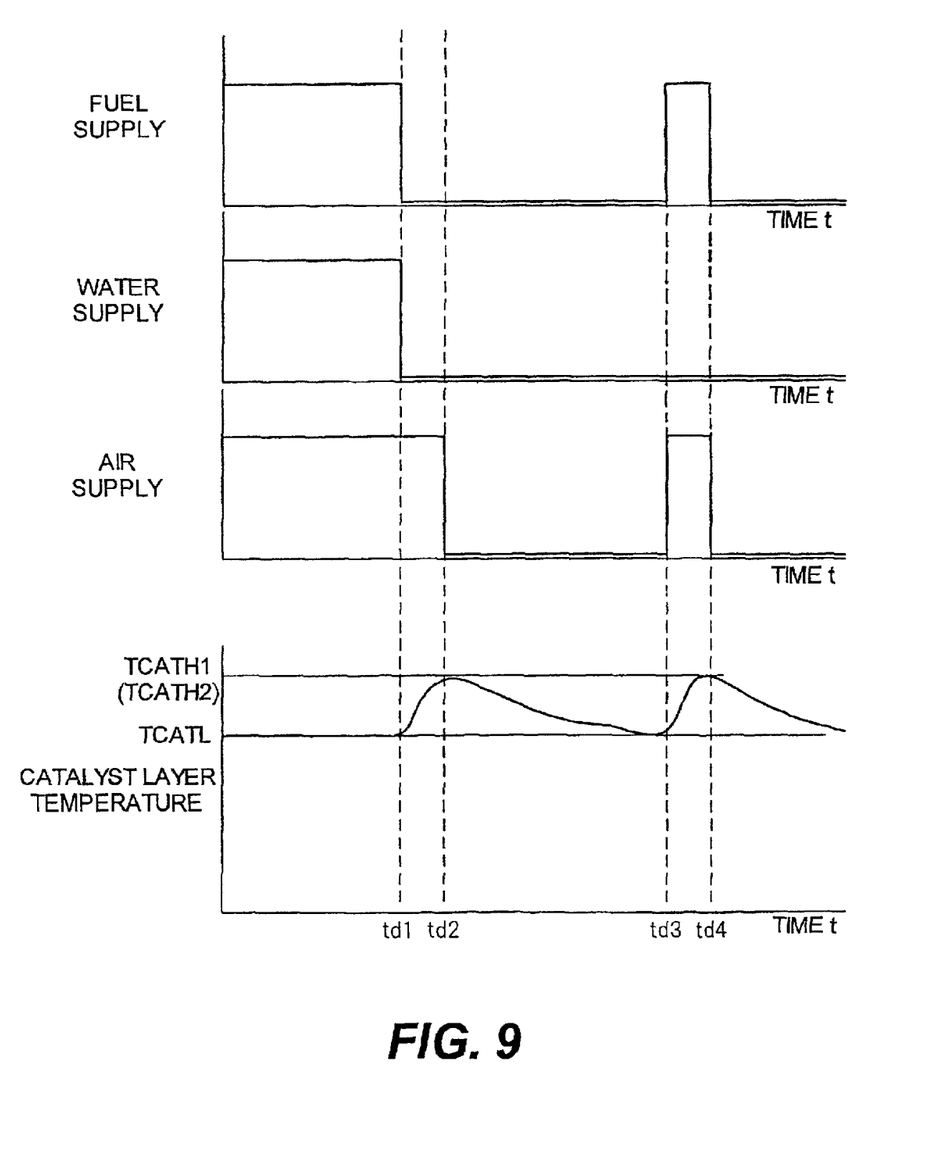
FIG. 9 is a time chart showing how fuel, water, air supply flowrate and catalyst layer temperature vary when the fuel reforming system stops in the fourth embodiment.

FIG. 9 shows how the fuel, water and air supply flowrates, and catalyst layer temperature, vary, when the above processing is performed.

When the supply of fuel and water to the reformer 1 is stopped at a time td1, there is temporarily a high proportion of air in the reformer 1, the partial oxidation reaction is activated and the catalyst layer temperature rises.

When the catalyst layer temperature reaches the first upper temperature TCATH1 and supply of air to the reformer 1 is stopped, the partial oxidation reaction which is an exothermic reaction no longer takes place, and rise of the catalyst layer temperature stops (time td2).

Subsequently, as time passes, the catalyst layer temperature falls gradually, and when the catalyst layer temperature falls below the lower limit temperature TCATL, air and fuel are supplied until the catalyst layer temperature reaches the second upper limit temperature TCATH2 (time td3 to td4). Here, the second upper limit temperature TCATH2 is set to be within the temperature range, which lies from approximately 0° C. to 100° C. lower than the first upper limit temperature TCATH1.

Hence, the catalyst layer temperature is maintained within a predetermined range when the system has stopped, the catalyst layer temperature can be maintained at a high temperature even if a long time is required until restarting, and the restarting time can be shortened. Further, as the catalyst layer temperature is maintained within a predetermined range, not only the catalyst layer temperature is prevented from failing before restating, but also the catalyst layer temperature is prevented from rising above the catalyst heat resistance temperature.

This invention has been described by way of the above embodiments, and as no system modification or additions are necessary in any of the embodiments, the restarting time can be shortened with the existing system construction.

The above embodiments are only given as examples to which this invention may be applied, and should not be construed as being limiting in any way. For example, fuel and methanol were used in the above embodiments, but gasoline or another hydrocarbon may also be used.

The entire contents of Japanese Patent Application P2000-352594 (filed Nov. 20, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A method of stopping a fuel reforming system with a reformer which generates hydrogen supplied to a fuel cell wherein fuel, water and air are supplied, and a partial oxidation reaction and steam reforming reaction are simultaneously performed, comprising:

stopping the supply of fuel and water to the reformer so as to raise the catalyst layer temperature of the reformer by performing a partial oxidation reaction with the remaining fuel and air in the reformer, and stopping the supply of air to the reformer after the catalyst layer temperature has risen.

2. A method as defined in claim 1, wherein:
supply of air to the reformer is stopped after a predetermined time has elapsed from when supply of fuel and water is stopped.

3. A method as defined in claim 1, wherein:
supply of air to the reformer is stopped after the catalyst layer temperature has reached a predetermined high temperature.

4. A method as defined in claim 1, further comprising:
supplying air and fuel to the reformer intermittently when the system has stopped.

5. A method as defined in claim 1, further comprising:
supplying air and fuel to the reformer so that the catalyst layer temperature lies within a predetermined range when the system has stopped.

6. A method as defined in claim 5, wherein:
supply of air and fuel to the reformer is started when the catalyst layer temperature falls below a predetermined low temperature, and supply of air and fuel to the reformer is stopped when the catalyst layer temperature reaches a predetermined high temperature when the system has stopped.

7. A fuel reforming system, comprising:
a reformer which generates hydrogen supplied to a fuel cell wherein fuel, water and air are supplied, and a partial oxidation reaction and steam reforming reaction are simultaneously performed, a first supply mechanism which supplies fuel and water to the reformer, a second supply mechanism which supplies air to the reformer, and a controller which functions to:
perform a partial oxidation reaction with the remaining fuel and air in the reformer by stopping the supply of fuel and water to the reformer from the first supply mechanism when the system is stopped, and stop the supply of air to the reformer from the second supply mechanism after the catalyst layer temperature has risen.

8. A fuel reforming system as defined in claim 7, wherein:
the controller stops the supply of air to the reformer from the second supply mechanism after a predetermined time has elapsed since the supply of fuel and water to the reformer from the first supply mechanism is stopped.

9. A fuel reforming system as defined in claim 7, further comprising a sensor which detects the catalyst layer temperature of the reformer, and the controller stops the supply of the air to the reformer from the second supply mechanism when the catalyst layer temperature of the reformer reaches a predetermined high temperature.

10. A fuel reforming system as defined in claim 7, wherein:
the controller further functions to intermittently supply air and fuel to the reformer from the first and second supply mechanisms when the system has stopped.

11. A fuel reforming system as defined in claim 7, further comprising a sensor which detects the catalyst layer temperature of the reformer, and the controller further functions to:

supply air and fuel to the reformer from the first and second supply mechanisms so that the catalyst layer temperature lies within a predetermined range when the system has stopped.

12. A fuel reforming system as defined in claim 11, wherein the controller supplies air and fuel to the reformer from the first and second supply mechanisms when the catalyst layer temperature falls below a predetermined low temperature, and stop the supply of air and fuel to the reformer from the first and second supply mechanisms when the catalyst temperature reaches a predetermined high temperature when the system has stopped.

13. A fuel reforming system, comprising:
a reformer which generates hydrogen supplied to a fuel cell wherein fuel, water and air are supplied, and a partial oxidation reaction and steam reforming reaction are simultaneously performed, a first supply mechanism which supplies fuel and water to the reformer, a second supply mechanism which supplies air to the reformer, means for performing a partial oxidation reaction with the remaining fuel and air in the reformer by stopping the supply of fuel and water to the reformer from the first supply mechanism when the system is stopped, and means for stopping the supply of air to the reformer from the second supply mechanism after the catalyst layer temperature has risen.

* * * * *